INVENTOR.
MARSH E. SMITH
BY Robb & Robb
attorneys

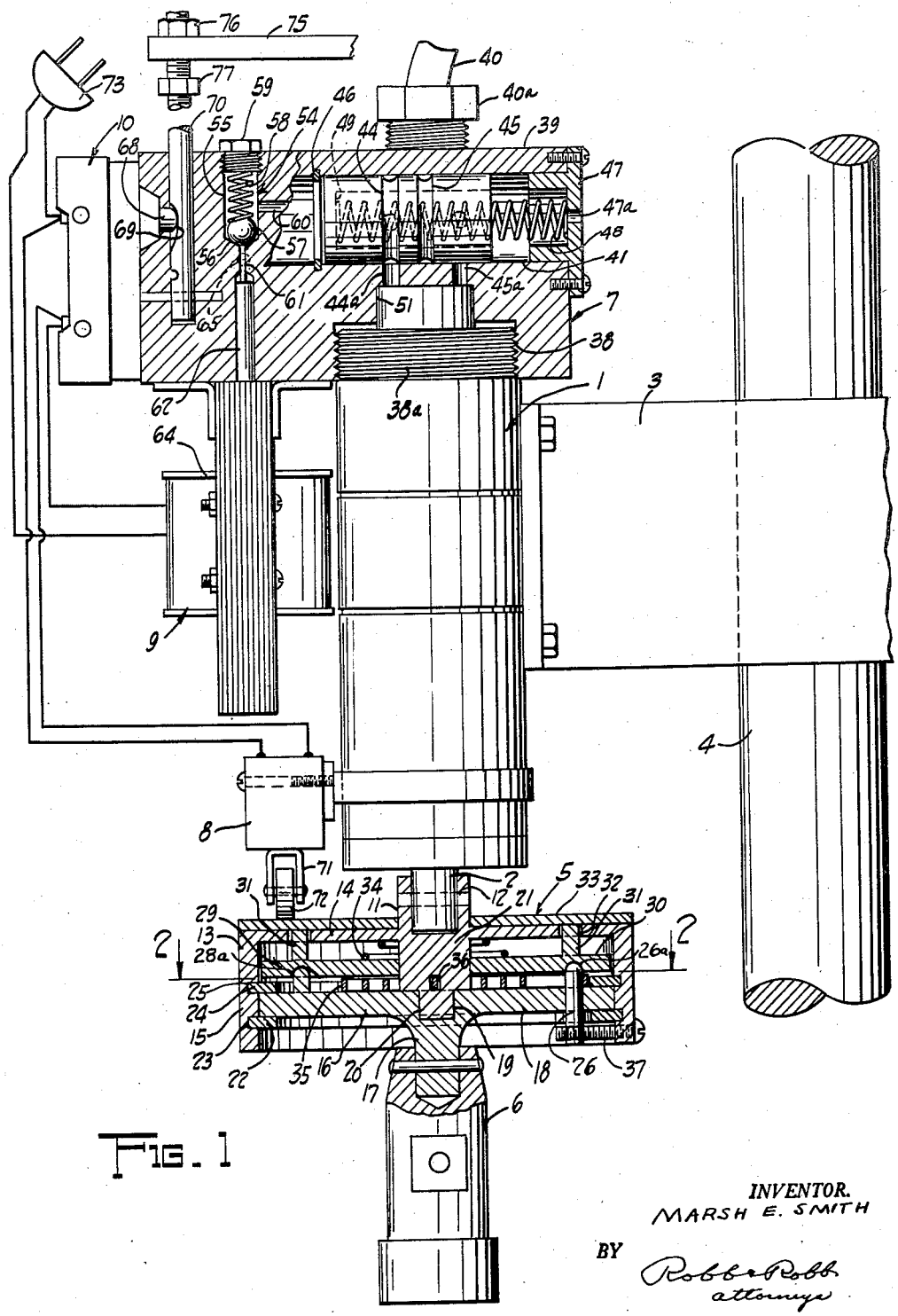

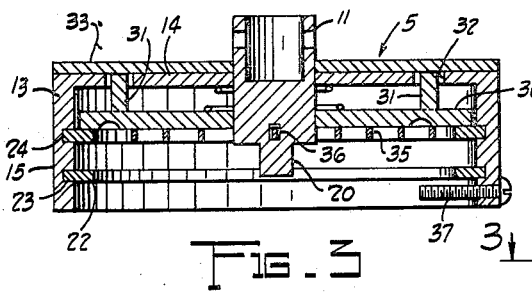
Fig. 3
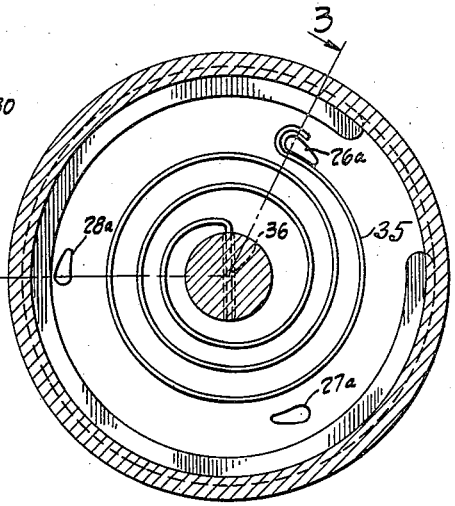
Fig. 2
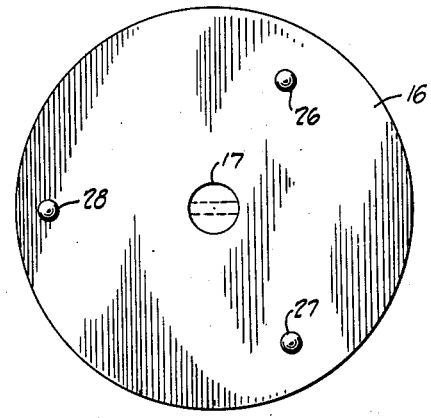
Fig. 4
Fig. 5
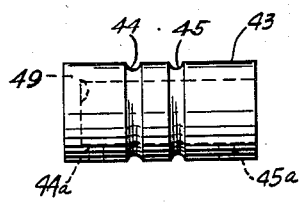
Fig. 13
INVENTOR.
MARSH E. SMITH
BY
Robb & Robb
attorneys April 15, 1958 M. E. SMITH 2,830,310
AUTOMATIC TAPPING MECHANISM WITH TORQUE
RESPONSIVE REVERSING MEANS
Filed Nov. 20, 1953 4 Sheets-Sheet 3
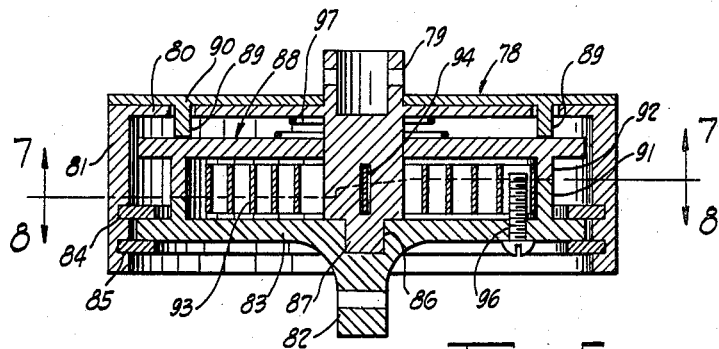
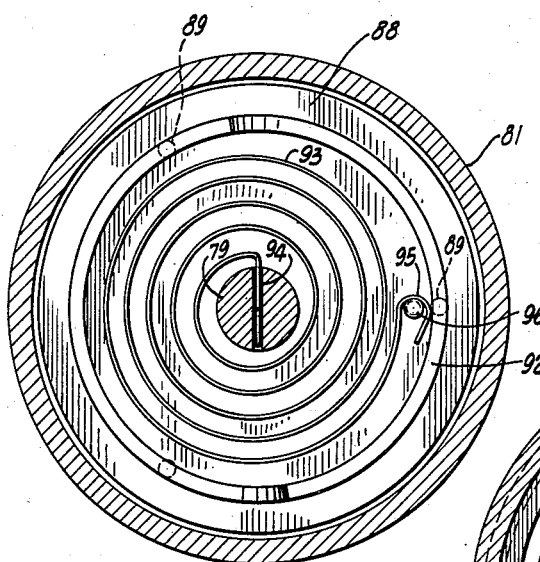
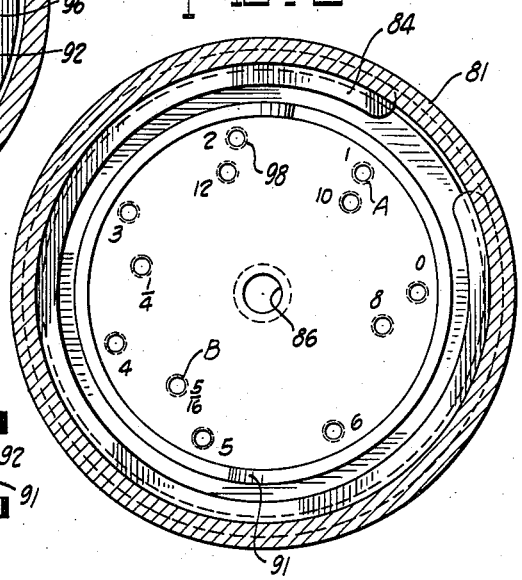
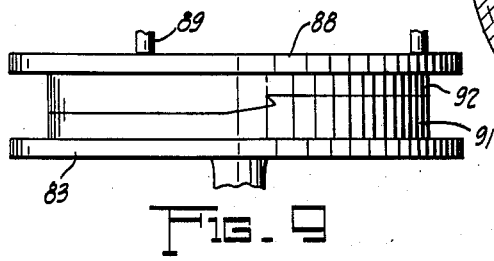
INVENTOR.
MARSH E. SMITH
BY
Robb & Robb
attorneys April 15, 1958 M. E. SMITH 2,830,310
AUTOMATIC TAPPING MECHANISM WITH TORQUE
RESPONSIVE REVERSING MEANS
Filed Nov. 20, 1953 4 Sheets-Sheet 4

United States Patent Office 2,830,310
Patented Apr. 15, 1958

2,830,310

AUTOMATIC TAPPING MECHANISM WITH TORQUE RESPONSIVE REVERSING MEANS

Marsh E. Smith, Cleveland Heights, Ohio

Application November 20, 1953, Serial No. 393,270

10 Claims. (Cl. 10—136)

This invention relates to machining mechanism and more particularly to that suitable for tapping operations.

At the present time many different tapping devices or machines are in use to perform tapping operations, but there are numerous instances where they are unable to accomplish satisfactory results. This is particularly true where holes of very small diameter are desired to be tapped, involving the use of correspondingly small taps which are susceptible of breakage in the hole and the consequent loss of time as a result. Such loss may involve not only the actual piece of material being tapped but in many cases the value of previous machining operations where tapping is a final operation. Although means for removal of broken taps have been developed and are successful, it is obviously advantageous to prevent the breakage initially.

The foregoing is only one phase of the cost of finished parts, the fact being that in many metals presently coming into more extensive use, no satisfactory machine has been marketed which will carry out the desired operation, and hand tapping must be resorted to with its attendant inherent slow results.

It is obvious from the foregoing that a machine which will substantially eliminate previous difficulties is required and this invention provides the necessary mechanism for that purpose.

Generally speaking this invention contemplates the provision of mechanism for carrying out machining operations which automatically react, in response to resistance encountered by a tool in performing its function on a work piece, to gradually carry out the operation, suitable provision being made to cause the tool to effect its purpose without breakage.

More specifically the purpose of this invention is to provide mechanism which avails of certain desirable characteristics of known drive means, combined with a unique torque responsive device, together with a novel control unit, which will carry out machining operations both rapidly and efficiently, being automatically sensitive to conditions encountered.

It is therefore a principal object of this invention to provide a mechanism which includes a torque responsive device for actuation of a control unit to regulate the driving operation of a tool member in carrying out a variety of machining operations.

A further object of the invention is to combine a torque responsive device with a fluid power drive unit and control instrumentalities for alternately driving a tool member in its work performing direction, reversing the direction of operation, and thereafter again causing the initial operating direction of the tool to be re-established.

A still further object of the invention is to provide a tapping mechanism having a power drive which is capable of rotatably driving a torque responsive device which includes a resilient connection to an output member, the torque responsive device including elements for operating a control unit capable of changing the direction of rotation of the device in response to resistance encountered in the tapping operation.

Another object of the invention is to provide a novel torque responsive device which includes an input shaft driven from a suitable power source, an output shaft which is adapted to rotate a tap or the like, there being resilient connection between the shaft, and instrumentalities for shifting a part of the device to operate means which control the direction of rotation of the shafts, the factor by which the direction is determined being the resistance encountered by the tap in carrying out the tapping operation.

A further object of the invention is to provide a suitable control unit which will be responsive to movement of a part of the torque responsive device to instantly reverse the direction of rotation of a power drive whereby resistance encountered by a tool will be compensated for and breakage of the tool obviated.

A further object of the invention is to combine a pneumatic motor capable of driving a torque responsive device, which in turn causes a tool to be moved in performing a machining operation, with a combined electric and pneumatic control unit, in such a manner that the operation of the tool may be carried out with possibility of breakage substantially eliminated.

Other and further objects of the invention will be understood from a consideration of the specification appended hereto and shown in the drawings wherein:

Figure 1 is a side elevational view of the mechanism of this invention, certain portions thereof being shown in sections and other portions being illustrated fragmentarily.

Figure 2 is a sectional view taken as nearly as possible on line 2—2 of Figure 1 looking in the direction of the arrows.

Figure 3 is a vertical sectional view taken approximately on the line 3—3 of Figure 2 looking in the direction of the arrows, certain additional parts being shown.

Figure 4 is a side elevational view of one of the parts of the torque responsive device.

Figure 5 is a top view of the parts shown in Figure 4.

Figure 6 is a vertical sectional view of a modified form of torque responsive device.

Figure 7 is a sectional view taken about on the line 7—7 of Figure 6 looking in the direction of the arrows.

Figure 8 is a sectional view taken about on the line 8—8 of Figure 6 looking in the direction of the arrows.

Figure 9 is a view in elevation showing the cam members used in the device shown in Figure 6.

Figure 13 is a view in elevation of the hollow piston.

Figure 10:
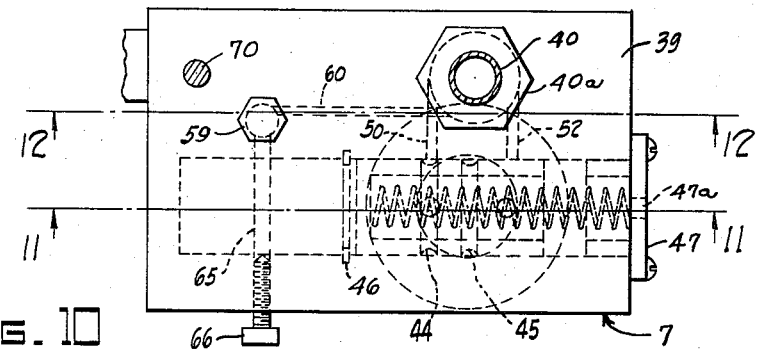
Figure 10 is a top plan view of the portion of the control unit illustrated at the upper part of Figure 1.

While the mechanism to be described hereinafter is shown as being particularly suitable for use as a tapping mechanism, it is understood that similar machining operations, which require manipulation of tools subject to breakage may also be accomplished by the use of the novel units generally described and particularly illustrated.

Referring now to Figure 1 in the drawings, the mechanism hereof is shown as comprising a power drive unit generally designated 1 having a drive shaft 2 at its lower end, the unit 1 being mounted on a suitable bracket 3. The bracket 3 is intended to be supported on a column 4 for movement up and down thereon, and to be guided in any preferred manner. The manner of movement of the bracket 3 and consequently the parts supported thereon, may be carried out in any conventional manner and is not shown.

Mounted so as to be supported on the shaft 2 of the unit 1, is a torque responsive device generally designated 5, which device is intended to operate a tool holding chuck 6, which chuck 6 is adapted to operatively engage a tap or similar tool.

Mounted adjacent the upper end and on the upper end of the power drive unit 1 is a control unit generally designated 7, which control unit includes a switch 8, and an operating unit generally designated 9, together with another switch unit designated 10, the various operating parts of the control unit 7 being more particularly described hereinafter.

The drive unit 1 is preferably an air motor or pneumatic motor of any conventional type, such motors being well known and therefore not illustrated in detail here. However it should be pointed out that one of the characteristics of air motors which particularly adapt them for use herein, is the fact that they are readily reversible, and when the supply of air is cut off therefrom, they stop rotating virtually instantly and may be therefore subsequently reversed without any substantial lost motion involved.

The torque responsive device 5 will first be described in detail and is shown as comprising an input shaft 11, which shaft is suitably fastened to the shaft 2 of the unit 1 by means of a pin 12. The input shaft 11 is preferably integrally provided with a body 13, which body includes a round or disc-like portion 14 at the outer edge of which and depending therefrom is an annular ring-like member 15, the ring-like member 15 being integral with disc 14.

The body 13 is thus substantially hollow interiorly thereof, and mounted within the body is an output member 16, including a shaft portion 17 thereon, and a disc portion 18 integral therewith. At the central portion of the disc 18, the same is provided with bearing section 19, adapted to receive mating member 20, the same being an extension of the input shaft 11 and including the hub 21.

In order to support the output shaft 17 and disc 18 integral therewith, within the body 13, so as to be rotatable with respect to the body 13, a snap ring 22 is provided, seated in an annular groove 23 in member 15.

A further snap ring 24 is provided, seated in a similar annular groove 25, just above the disc 18, and thus the member 16 confined thereby is positioned within the body 13 as will be apparent.

Turning to Figures 4 and 5 in the drawings, it will be seen that the member 16 is provided with cam elements in the form of posts, designated 26, 27, and 28. The post 27 as seen in Figure 1 extends through and below the disc 18 for purposes which will be explained subsequently, the upper ends of each of the members 26, 27, and 28 being formed with cam surfaces as shown.

Carried within the body 13 and above the member 16, is a cam unit generally designated 29, which cam unit includes a disc or plate 30 and extending upwardly therefrom and integral therewith the posts 31, the same being preferably three in number spaced uniformly around the upper surface of the member 30, the posts 31 in turn being entered in suitable openings 32 in the part 14 of the housing 13. Integrally fastened with the upper ends of the posts 31, is a cam plate 33 for operation of the switch 8 in a manner to be subsequently set forth.

Intermediate the lower surface of the disc 14 of the housing or body 13, and the upper surface of the disc or plate 30, is a suitable light coil spring 34, which thus maintains the cam plate 33 in the position generally as shown in Figure 1 normally.

It should be pointed out that the posts 26, 27, and 28, are spaced uniformly around the disc 18, and extend upwardly therefrom. However it should be further noted that the radial spacing of such posts is calculated so as to be different in each case for the reasons which will be apparent hereinafter.

Suitably formed in the lower face of the disc or plate 30, are cam dwells as shown in Figure 2, and generally denoted 26a, 27a, and 28a. It will be clear that the cam dwells above mentioned, are adapted to normally receive therein the cam surfaces of the posts 26, 27, and 28 and when there is relative rotation between the cam surfaces of the posts and the cam dwells, upward movement of the cam unit 29 will take place.

In order to form a connection between the input shaft 11 of the torque responsive device being described, and the output shaft 17 thereof, a suitable coil spring designated 35 is provided, and more particularly shown in Figure 1 as being connected at its inner end at 36 to the part 21 of the housing 13, and at its outer end suitably engaged with the post 26. Thus the drive is carried from the input shaft 11 to the output shaft 17 through the spring 35, in a resilient manner. The spring 35 is suitably tensioned at assembly of the respective parts, by winding it so that its tension is just under the static breaking torque of the particular size tap to be used and mounted in the chuck 6. The tensioning of the spring in this manner is maintained by means of a suitable set screw 37, which is entered in the lower edge of the skirt 15, and engages the lower end of the post 26 as will be understood upon consideration of Figure 1. The parts normally maintain the positions as shown in Figure 1 during normal operation of the tap in its tapping motion, but in the event resistance is encountered by the tap in its operation, relative rotation takes place as between the member 16 ad the cam unit 29, to thereby cause the cam portions of the posts 26, 27, and 28 to ride out of the cam dwells 26a, 27a, and 28a. This will clearly be accompanied by a corresponding rise in the cam unit 29 as a whole, carrying the cam plate 33 upwardly from the position shown in Figure 1, to actuate switch 8 as will be subsequently explained.

This action of the respective parts, will cause a winding of the spring for example, and obviously will be subsequently accompanied when the relationship shown in Figure 1 of the cam portions and the cam dwells is reestablished, by an unwinding of the spring or a resumption of its normal tension attitude in that figure. The exact reasons for the foregoing will be understood when the general operation of the device is set forth.

Figure 11:
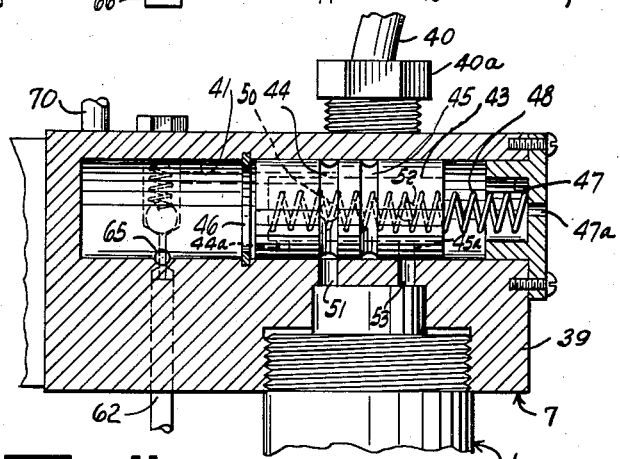
Figure 11 is a vertical sectional view taken about on the line 11—11 of Figure 10 looking in the direction of the arrows.
Figure 12:
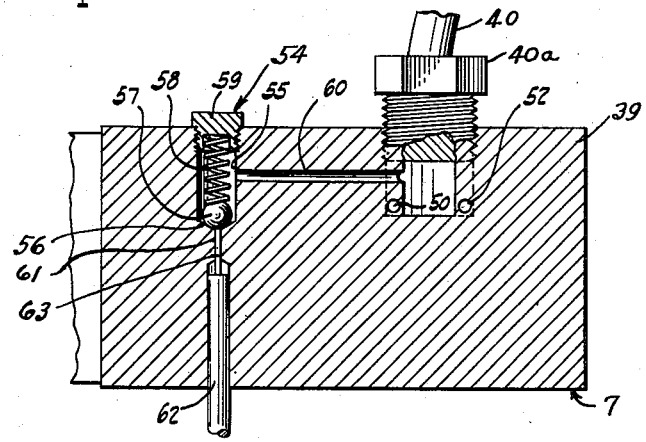
Figure 12 is a vertical sectional view of the control unit shown in Figure 10 taken about on the line 12—12 of that figure.

Turning now to a consideration of the control unit which is shown in Figure 1 at the upper part thereof, and in Figures 10, 11, and 12, it will be seen that the unit as a whole is provided at its lower portion with a threaded section 38, adapted to receive correspondingly threaded portion 38a formed on the upper end of the air motor drive unit 1. The control unit as a whole comprises a body generally of rectilinear configuration, including a body portion 39 with which is connected an air line 40 as by means of the coupling nut 40a. The air is directed from the line 40 into a piston and cylinder section in which the cylinder is denoted 41, the same comprising a longitudinal bore in the body 39 at one side and substantially throughout the length thereof. Within the bore and adapted to reciprocate therein, is a piston 43, which piston 43 is provided with annular grooves designated 44 and 45. As seen in Figures 1 and 11, the piston is mounted for reciprocation in the cylinder 41 between a snap ring 46 and a cap or stop 47. The snap ring 46 of course is received in a groove formed in the interior wall of the cylinder 41 in accordance with conventional practice.

The piston 43 is hollow and is adapted to receive therewithin a spring 48, which spring 48 at one end engages the cap 47 and at the other end is seated on the end wall 49 of the piston. The spring normally maintains the piston 43 at the extreme left position as shown in Figures 1 and 11. The annular groove 44 is intended to normally receive air delivered from a passage 50, from the air line 40, and in turn direct the air to what will be termed the clockwise port 51, in the body 39, which clockwise port 51 communicates with a port in the air motor which will turn the same in a clockwise direction.

As will be clear the groove 45, when the same is moved with the piston 43 toward the right, so as to lie opposite the passage 52 will correspondingly direct air from the line 40 into the passage 53 which will be termed the counter clockwise port of the air motor. Obviously the admission of air into the passage 53 and thence to the air motor will cause the air motor to turn in a counterclockwise direction and at the same time shut off the air formerly delivered to the passage 51.

In order to control the movement of the piston from left to right or from right to left, a suitable check valve generally designated 54 is provided, the same being formed in the body 39 and comprising a cylindrical opening 55, at its lower end being reduced and provided with a seat 56 upon which a ball 57 is seated, and held in seated condition by means of a suitable spring 58, which spring is in turn maintained in contact with the ball by a threaded cap 59. A passage from the cylindrical bore 55 and denoted 60 is provided, whereby communication between the supply line 40 and the cylindrical passage 55 is effected. This passage is shown in Figure 12 and indicated in dotted lines in Figures 10 and 11, as being a longitudinal passage substantially parallel to the cylinder 41 and spaced therefrom.

Below the seat 56 and connected with the cylindrical passage 55 is a reduced passage 61 in which is intended to be operated the end of a rod-like member 62, which end is denoted 63. The member 62 is in turn connected with a solenoid unit 64, which solenoid unit 64 is connected so as to reciprocate the member 62 upon energization of the solenoid 64. It will be understood that when the solenoid is energized, the portion 63 of the member 62 will be moved upwardly as viewed in Figures 1 and 12, to thereby raise the ball 57 off of the seat 56 and permit the flow of air as will be subsequently set forth.

Communicating with the cylinder 41 beneath the seat 56, is a transverse passage 65, shown in Figure 10 and in Figures 1 and 12 as well as Figure 11, which transverse passage is formed so as to communicate with the interior of the cylinder 41 and under the control of a needle valve 66 to permit the flow of air to the atmosphere. It should be understood that the regulation of the rate at which the air flows out of the passage 65 is controlled by the needle valve 66, the needle valve 66 being of any preferred and well known form.

At the left hand end of the control unit now being described, a suitable switch previously referred to as number 10, includes a plunger 68 connected thereto, which plunger 68 is in turn adapted to enter and normally rest against a reduced portion 69 of a control rod 70 to operate in a manner subsequently to be described. The switch 10 is connected, with the switch 8 previously referred to, to suitable source of electric energy the circuit being arranged so that either the switch 8 or the switch 10 may control actuation of the solenoid 64 upon operation of the respective switches in a manner now to be described.

Referring again to Figure 1, it will be seen that the switch 8 is provided with a depending arm 71, which arm is in turn equipped with a roller 72, the roller 72 being adapted to roll in contact with the upper surface of the plate or disc 33 previously described. The switch 8 in the position of the respective parts as shown in Figure 1, is inactive so to speak or the contacts therein are open, thus the circuit controlled thereby is likewise open at this point. Correspondingly the contacts within the switch 10 at the upper part of the mechanism as shown in Figure 1 are likewise in the same condition, namely that in which the contacts thereof are open and the circuit thus not completed.

Assuming that the parts are in the condition shown in Figure 1, and it is desired to begin operation of the mechanism, the electrical plug as for example that denoted at 73 is connected with a suitable source of electric energy, and the air supply line 40 is connected with a suitable supply of air. The air will therefore flow through the line 40 and around the groove 44 hence into the passage 50 and thereby and thereafter into the clockwise port 51 of the control unit 7 and thus to the air motor 1. The air motor 1 will thereupon be caused to rotate the shaft 2 thereof in a clockwise direction, carrying with it the torque responsive device 5, and correspondingly the chuck 6 in which may be mounted a tap, intended to tap a hole.

We have therefore a condition in which the torque responsive device 5 is rotating in a clockwise direction, and normally carrying on the tapping operation of the tap, with the whole mechanism moving downwardly on the column 1. In the event the tap in the chuck 6 meets resistance which may have a predetermined value, such that if the chuck 6 was continued in rotation, the tap would break, assuming that the predetermined value was exceeded, just prior to that condition existing, the output shaft 17 of the member 16 will be permitted to slow down in relation to the rotation of the cam unit 29, by reason of the fact that the spring 35 will permit resilient drive to the output shaft 17 and thus some relative rotation as between the member 16 and the cam member 29. At this point the cam portions of the posts 26, 27, and 28 will ride out of the respective dwells 26a, 27a, and 28a, thereby causing the cam unit 29 as a whole to rise. This will obviously cause the top member or plate 33 thereof to rise and thus in turn shift the arm 71 of the switch 8 upwardly. This will take place by reason of the fact that the roller 72 is riding on the upper surface of the plate 33. At this time contacts in the switch 8 are made, and by reason of the circuit thus being energized, the solenoid 64 will be correspondingly energized. Energization of the solenoid 64 will cause the part 62 thereof to rise as viewed in Figure 12, in turn moving the reduced portion 63 upwardly and raise the ball 57 off the seat 56. Air will thereupon flow through the passage 60 from the main supply 40 and hence into the passage 65, and thus reach the interior of the cylinder 41. This air rushing into the cylinder 41 will cause the piston 43 thereof to move toward the right as viewed in Figure 11, whereby the supply of air through the passage 50 and the clockwise port 51 will be shut off and immediately thereafter air will be supplied through the passage 52, to the groove 45 and thence to the counter clockwise port 53. In view of the fact that the rotor of the air motor 1 comes to a stop substantially immediately when air is shut off as is true under the present circumstances, by the closing of the clockwise port 51, subsequent admission of air through the counter clockwise port 53 will immediately cause the air motor to rotate in the opposite direction, and obviously the shaft 2 thereof will similarly rotate in the opposite direction. By this action, the torque responsive unit 5 is also caused to rotate in the opposite direction, and thereby the cam member 29 similarly rotates with the main housing 13. The spring 34 causes the cam member 29 to move downwardly when the dwells 26a, 27a, and 28a are again in position over the respective ends of the posts 26, 27 and 28 upon which the cam portions are formed. This will obviously cause a resumption of the relationship of the parts as shown in Figure 1, and thereby the contacts within the switch 8 are broken, the solenoid 64 is de-energized and the member 62 thereof assumes the position as shown in Figure 12 permitting the ball 57 to again assume its position on the seat 56 as shown in Figures 12 and 1. The air which was introduced into the left hand end of the cylinder 41 is permitted to flow to the atmosphere through the passage 65 under the control of the needle valve 66 at any preferred rate, and this in turn controls the rate at which the piston 43 will again move toward the left under the compulsion of the spring 48. This may be regulated in accordance with demands of the material being tapped or the amount of time which is desired to have the air motor rotate in a counter clockwise direction and cause the tap to be backed up in the hole thus clearing the chips which have in part caused the resistance initially.

It will be therefore obvious that the air will again be directed through the passage 50 into the groove 44 and thence to the clockwise port 51 of the air motor and thereby the clockwise rotation of the air motor is again inaugurated to in turn cause the torque responsive unit 5 to resume its tap driving or operating direction. It will also be understood that if the tap again meets resistance it will cause a separation of the cam member 29 and posts 26, 27, and 28 so as to actuate the switch 8. A further reversal of driving direction of the chuck 6 is effected for a predetermined length of time in accordance with the control of the escape of air by the needle valve 66. It should be understood clearly that the action above described may take place very rapidly and thus there is a constant reversal of direction of the torque responsive unit 5 and thus the chuck 6, as long as the resistance met by the tap in the hole is such as to cause the actuation of the parts as described. Each time the tap will move slightly farther in its tapping direction as will be apparent, in view of the fact that the chips are cleared in each reversal of the chuck 6 as determined by the control unit 7 as described.

When the mechanism has accomplished the tapping operation, which will be done as a result of a downward movement of the entire unit, it will be apparent that suitable provision may be made for reversing the air motor so as to withdraw the tap. This may be done by providing an arm 75, in which the upper end of the control rod 70 may move and be adjusted by means of the nuts 76 and 77 on a suitable threaded section of the rod 70. Thus when the nut 76 approaches and is contacted by the arm 75, the rod 70 will be moved upwardly relatively speaking and cause the plunger 68 of the switch 10 to be moved toward the left as seen in Figure 1, which will cause a completing of the circuit by the switch 10, to energize the solenoid 64 in a manner as previously described in relation to the switch 8. This will obviously cause the reversal of the air motor in the same manner, by reason of the change in direction the flow of the air thereto, under the control of movement of the piston 43 of the control unit 7. Obviously when the tap is withdrawn from the hole and the whole unit or mechanism is moved upwardly, subsequent impingement of the nut 77 at the under side of the arm 75 will cause the rod 70 to move downwardly relatively speaking so as to again assume the position as shown in Figure 1 and permit the circuit to be broken for the switch 10. This will obviously cause the solenoid to be de-energized and thus the piston 43 permitted to move toward the left and again cause air to be introduced through the clockwise port 51 in the control unit and thus to the motor 1 to again cause rotation of the tap in the clockwise direction to effect a further tapping operation. In the torque responsive device 5 above described as to its operation, it will be understood that the spring 35 may be provided so as to be of various strengths, as by different springs, so as to use the same with taps of different sizes. However in view of the fact that there are obviously limits which may be reached, and since it is desirable to provide adjustment of the torque delivered by the device 5, to compensate for conditions encountered by various sized taps, the device of Figures 6, 7, 8, and 9 is shown, the same being a modification of the device 5 described.

Turning therefore to a consideration of those Figures 6, 7, 8, and 9, it will be seen that the unit generally denoted 78, is a torque responsive device like that of Figure 5 including an input shaft 79, which is integral with a housing comprised of a disc or plate 80 and an annular ring 81 fastened or formed therewith. A similar arrangement of the output shaft 82 of this device to that of the shaft 17 in the Figure 1 disclosure, may be provided in the form of a further disc 83 mounted so as to rotate relative to the ring 81 and supported between snap rings 84 and 85. Likewise a central bearing opening in the disc 83 is provided at 86, so as to receive a mating member 87 therein, the mating member 87 being an extension of the shaft 79 and integral therewith.

A similar cam unit or member generally designated 88 to that of the device 5 is provided in the form of a plate or disc, and integral therewith or fastened thereto are the cam operating posts 89 suitably spaced near the periphery of the disc 88, and integral with a camming plate 90 similar to the plate or disc 33 previously discussed.

In the device 78 now being described, the primary difference resides in the formation of the camming sections of the respective members 83 and 88. In this instance the member 83 is provided with a cam in the form of an annular member 91 adapted to mate with a corresponding cam 92 formed on the lower side of the member 88 including suitable cam surfaces thereon. Within the chamber formed by the members 83, 88, 91 and 92, a suitable coil spring 93 is provided, and fastened as shown at 94 to the shaft 79, being similarly fixed at its other end as at 95 to a screw 96. A light coil spring 97 may be provided and is preferably provided mounted between the disc 80 and the upper surface of the cam member 88, so as to maintain the cam portions 91 and 92 normally in contact.

In order to adjust the tension on the spring 93, a series of openings 98 are provided in the member 83, whereby the proper spring tension for a large number of taps is established. In other words by setting the screw 96 in an opening corresponding to one size of tap as in the opening A, when the tap which is being driven by a chuck such as 6 encounters resistance, the spring will permit the actuation of the respective cam sections 91 and 92 and the operation of the control unit 7 of the device in a manner similar to that previously discussed. Correspondingly by winding the spring to position the end 95 thereof so as to be maintained by the screw 96 in an opening such as B, a larger size tap may be operated to carry out its tapping operation, and thus the spring 93 is able to accommodate a large number of taps. It will be obvious that the other openings 98 in the member 83 may be correspondingly located so as to accommodate various sized taps with the same spring but by adjustment thereof. Otherwise the torque responsive device 78 operates in all respects exactly like that described with reference to the device 5 of Figure 1 to carry out the tapping operation or other similar machining operation where resistance encountered by a tool operating on a work piece is desired to be availed of to cause a reversing action of the drive unit which operates the tool and to thereafter re-establish the initial operating action of the tool in its performing of metal working operations.

In view of the foregoing it will be understood that a novel mechanism has been provided which may avail of relatively simple units, so as to accomplish metal working operations and eliminate, particularly in tapping operations the breakage of taps and a consequent loss of time and efficiency which obviously would result therefrom. It should also be understood that while an air motor is shown as being the driving instrumentality, any similar type of drive unit may be availed of which will stand reversing, and correspondingly similar controls to be resorted to which will effect such reversing operation in a manner substantially similar to that herein set forth. However it is notable that the combination of the electrical controlled valve and the air or pneumatic operation are found particularly suitable for use in tapping operation and the arrangement of the respective parts has been found in actual practice to result in the satisfactory tapping of an 83% thread in under sized holes, in alloy steels having a machinability rating of 35%. Ordinarily tapping holes in this type of material has been virtually impossible heretofore by hand and particularly impossible with prior machines known and used.

It might also be pointed out that the relative rotation required as between the member 16 of the output shaft of that member which drives the chuck 6 and the cam member 29 seem to be a very small amount in order to effect the reversing operation desired. It will also be understood that regulation of the rate of flow of the air from the needle valve 66 is to be availed of to determine the length of time which is desirable for the reversing of the tap by the chuck 6 to take place in order to adequately clear the chips and subsequently permit further tapping movement of the tap.

It is noted that piston 43 is a hollow piston and as shown in Figure 13 is provided with air vent holes 44a and 45a leading into the center thereof. The cap or seat 47 is provided with a vent 47a which provides for escape of air from the right end of the piston as viewed in Figures 1, 10, and 11.

When the piston is in the position of Figures 1 and 11, air which has passed through air motor 1 may escape through the counterclockwise port 53 through vent hole 45a and thence to atmosphere through opening 47a in cap 47. Conversely when piston has moved to right clockwise port 51 permits air to pass through vent hole 44a and thence to atmosphere through passage 47a.

I claim:

1. In a mechanism of the class described, a rotary drive shaft, a tool holder rotated thereby, torque-responsive means intermediate said shaft and said holder and actuatable in response to predetermined torque resistance encountered by said holder in one direction of rotation, reversible drive means for driving said shaft, control means responsive to actuation of said torque-responsive means for reversing the drive means to reverse the direction of rotation of said shaft when said holder encounters predetermined torque resistance, and means intermediate said torque-responsive means and said control means, and coacting therewith, to effect forward drive direction of said drive means when torque resistance encountered by said holder diminishes below said predetermined torque resistance while said holder is rotating in reverse direction, wherein forward or reverse rotation of said holder is contingent upon torque resistance encountered thereby.

2. Mechanism as claimed in claim 1, wherein the torque responsive means comprises an axially shiftable part to coact with the control means for operating the same, and a part resiliently connected thereto for drive operation, said parts being moved relatively when said holder encounters the said pre-determined torque resistance.

3. Mechanism as claimed in claim 1, wherein the torque responsive means is rotated by the drive shaft in either of opposite directions, said means include an axially shiftable part therein, another part therein resiliently connected thereto for drive thereby, said last named part being connected to the tool holder and said parts being moved relatively when the resistance to rotation of the holder is varied from a pre-set value.

4. Mechanism as claimed in claim 1, wherein the torque responsive means comprises an axially shiftable member having cam portions to transmit actuating movement to the control means, a resilient member is provided to rotate the holder in one direction, and other means are provided to rotate the holder in the other direction, both rotative movements being torque responsive as stated.

5. Mechanism as claimed in claim 1, wherein the torque responsive means comprises an axially shiftable cam member adapted to impart such movement to a part of the control means, rotative movement of said cam member in one direction is resiliently imparted to a further part connected to the tool holder, and other means are provided to rotate the tool holder in the opposite direction, rotation of said holder being contingent upon torque resistance as stated.

6. Mechanism as claimed in claim 1, wherein the torque responsive means comprises a rotatable unit, a part of said unit having cam elements is arranged to shift axially and impart movement to the control means, rotative drive of said unit being resiliently effected in one direction, another part of said unit is connected to the tool holder for driving the same, and cam means between the two parts aforesaid are arranged to rotate the unit in the opposite direction, both of said rotative movements being effected in response to the torque resistance as stated.

7. Mechanism as claimed in claim 1, wherein pneumatic drive means are connected to the drive shaft, the control means includes valve means to regulate rotative direction of said drive means, the torque responsive means comprise a rotatable unit arranged for rotation in either of opposite directions, said unit being driven by the said shaft, a shiftable part of said unit including cam elements is arranged to move axially and in turn impart movement to a part of the control means, said entire unit being rotated in one direction by resilient drive means connected to the shiftable part, another shiftable part in said unit is connected to the tool holder, and cam means are provided between said shiftable parts and arranged to drive the entire unit in the opposite direction, said direction of operation being effected as stated.

8. Mechanism as claimed in claim 1, wherein the control means include instrumentalities for regulating the distance of reverse direction rotation.

9. Mechanism as claimed in claim 1, wherein the control means include adjustable instrumentalities for regulating the distance of reverse direction rotation.

10. Mechanism as claimed in claim 1, wherein the control means include instrumentalities for varying the time during which the reverse direction rotation takes place in accordance with the type of material being operated on by a tool in the tool holder aforesaid.

References Cited in the file of this patent

UNITED STATES PATENTS

| 1,945,053 | Lundin | Jan. 30, 1934 |
| 2,144,769 | Melmer | Jan. 24, 1939 |
| 2,209,155 | Fagg | July 23, 1940 |
| 2,552,840 | Burke | May 15, 1951 |
| 2,562,170 | Busemeyer | July 31, 1951 |
| 2,580,061 | Adams | Dec. 25, 1951 |
| 2,725,918 | Deshler | Dec. 6, 1955 |

FOREIGN PATENTS

| 195,703 | Great Britain | Apr. 9, 1923 |